United States Patent [19]
Nieuwenhuis

[11] Patent Number: 5,505,927
[45] Date of Patent: Apr. 9, 1996

[54] PRODUCTION OF URANIUM HEXAFLUORIDE

[75] Inventor: Johan P. Nieuwenhuis, Pretoria, South Africa

[73] Assignee: Atomic Energy Corporation of South Africa Limited, Pelindaba, South Africa

[21] Appl. No.: 160,199

[22] Filed: Dec. 2, 1993

[30] Foreign Application Priority Data

Dec. 4, 1992 [ZA] South Africa ............... 92/9437

[51] Int. Cl.$^6$ .............. C01G 1/06; C01G 43/06
[52] U.S. Cl. ............................................ 423/258
[58] Field of Search ................................ 423/258

[56] References Cited

U.S. PATENT DOCUMENTS

| | | | |
|---|---|---|---|
| 3,149,909 | 9/1964 | Hatch et al. | 23/14.5 |
| 3,264,070 | 8/1966 | Ramaswami et al. | 423/258 |
| 3,490,881 | 1/1970 | Holmes et al. | 423/258 |
| 4,105,746 | 8/1978 | Compton et al. | 423/251 |
| 4,202,861 | 5/1980 | Bourgeois et al. | 423/19 |
| 4,960,581 | 8/1990 | Harada et al. | 423/489 |

FOREIGN PATENT DOCUMENTS

| | | | |
|---|---|---|---|
| 561140 | 10/1957 | Belgium . | |
| 333084 | 9/1989 | European Pat. Off. | C01B 9/08 |
| 0556135A1 | 8/1993 | European Pat. Off. | C01G 43/06 |
| 2626428 | 12/1977 | Germany | C01G 43/06 |
| 52-029706 | 8/1977 | Japan | B01D 7/02 |
| 63-74917 | 4/1988 | Japan | C01G 43/06 |
| 3-262526 | 11/1991 | Japan | B01J 8/26 |

*Primary Examiner*—Ngoclan Mai
*Attorney, Agent, or Firm*—Roper & Quigg

[57] ABSTRACT

A process for producing uranium hexafluoride comprises bringing fluorine gas into contact with reactive particles comprising uranium metal, as well as with non-reactive particles which are substantially inert and which are in contact with the reactive particles. The reactive particles are kept distinct from the non-reactive particles. The fluorine gas is allowed to react with the uranium metal at elevated temperature, thereby to produce gaseous uranium hexafluoride. The uranium hexafluoride is separated from any residual fluorine.

14 Claims, 2 Drawing Sheets

PRODUCTION OF URANIUM HEXAFLUORIDE

This invention relates to the production of uranium hexafluoride. It relates in particular to a process for producing uranium hexafluoride.

According to the invention, there is provided a process for producing uranium hexafluoride, which comprises bringing fluorine gas into contact with reactive particles comprising uranium metal, as well as with non-reactive particles which are substantially inert and which are in contact with the reactive particles, while keeping the reactive particles distinct from the non-reactive particles;

allowing the fluorine gas to react with the uranium metal at elevated temperature, thereby to produce gaseous uranium hexafluoride; and separating the uranium hexafluoride from any residual fluorine.

The process thus utilizes fluorine gas as such, ie fluorine in elemental or substantially unreacted or unconverted form, as reactant. In other words, it is not used in the form of a fluoride, such as xenon di-fluoride, or the like.

Furthermore, the reactive particles, while being in contact with the non-reactive particles, are kept distinct from the non-reactive particles, ie the reactive and non-reactive particles are not in the form of moulded, fused or sintered agglomerates in which the reactive and non-reactive particles are intimately bound to one another.

While the uranium metal can be of any enrichment level, the Applicant has found that the process provides an effective means of producing highly enriched uranium hexafluoride from highly enriched uranium. The highly enriched uranium hexafluoride thus produced can then be blended with uranium hexafluoride of suitable (lesser) enrichment to obtain a product with an enrichment level suitable for use in commercial nuclear reactors.

The reactive particles may comprise at least one further metal, in addition to the uranium, eg as an impurity. The further metal, if present, is then preferably of a type which will react with the fluorine gas to form non-volatile metal fluorides, which do thus not contaminate the gaseous uranium hexafluoride produced. The further metal, when present, can be aluminium, or the like.

The particles may be in the form of a bed of the particles, with the bringing into contact of the fluorine gas with the particles being effected by passing the fluorine gas upwardly through the bed of particles.

The reaction of fluorine gas with uranium metal is exothermic, and the process may thus include controlling the reaction temperature at a predetermined or desired value, eg at a temperature between 300° C. and 500° C., eg about 400° C.

The controlling of the reaction temperature may be effected at least partly by means of the bed arrangement or composition.

Thus, in one embodiment of the invention, the bed may comprise a bottom layer of the non-reactive particles, and an upper layer of the reactive particles on top of the bottom layer. The bottom layer thus disperses the fluorine gas over a wide area, ie over the entire cross-sectional area of the bed, thereby inhibiting formation of localized 'hot spots', ie localized zones of excessively high temperatures, due to uncontrolled localized reaction of fluorine gas with uranium metal.

In another embodiment of the invention, the bed may comprise a bottom layer of non-reactive particles and an upper layer which is a mixture of reactive and non-reactive particles, with the non-reactive particles in the upper layer spreading the heat of reaction throughout the upper layer and dispersing the reactive particles, thereby assisting in controlling the reaction temperature. The non-reactive particles in the upper layer may then be the same as, or different from, those of the bottom layer. Furthermore, a mixture of different species of non-reactive particles can be used in the bottom and/or upper layers, if desired.

The mass ratio of reactive particles to non-reactive particles in the upper layer may be between 30:1 and 20:1, eg between 27:1 and 23:1.

The reactive particles may be of any desired shape, and are preferably sufficiently small to permit ready and homogeneous mixing with the non-reactive particles; however, they should not be so small, eg powdered, as to be easily entrained in the gas stream. Preferably, they are in the form of shavings which can be produced readily under controlled conditions to prevent or inhibit nuclear contamination and to be substantially non-hazardous. Shavings also present a relatively high surface area per unit volume, which is conducive to good reaction rates.

Likewise, the non-reactive particles may be of any desired shape or size, bearing the abovementioned criteria in mind. They may be in the form of more-or-less rounded particles or granules, typically having maximum dimensions of about 5 to 15 mm. The non-reactive particles may comprise calcium fluoride ($CaF_2$), aluminum fluoride ($AlF_3$), sintered aluminum oxide ($Al_2O_3$), or the like. When they comprise a fluoride, they may also be in sintered form.

The controlling of the reaction temperature may instead, or additionally, be effected at least partly by passing a diluent gas, such as nitrogen or argon, through the bed of particles, together with the fluorine gas. The fluorine gas and diluent or carrier gas may be admixed prior to entering the bed; however, they then retain their constituent identities, ie the fluorine gas does not react with the carrier gas prior to its reacting with the uranium metal particles. The diluent gas dilutes the fluorine gas and hence retards the reaction rate, thereby controlling the reaction temperature.

The process may thus include controlling the fluorine gas flow rate and/or the diluent gas flow rate and/or the mass ratio of fluorine gas to diluent gas, thereby to control the reaction temperature. The mass ratio of fluorine gas to diluent gas may be between 1:1 and 1:20.

The mass ratio of fluorine gas to uranium may be between 0,5 kg fluorine gas per kg uranium and 1,5 kg fluorine gas per kg uranium.

The mass flow rate of fluorine gas may be between 0,04 kg fluorine gas per hour per kg uranium and 0,15 kg fluorine gas per hour per kg uranium.

The reaction of the fluorine gas with the uranium may be effected under substantially dry conditions. Thus, if necessary, the particles may be dried.

While the reaction of the fluorine gas with the uranium may at least in principle be effected at sub-atmospheric pressure, it is preferred to effect it at a pressure greater than atmospheric pressure to provide the necessary driving force for downstream processing of the uranium hexafluoride.

The bed of particles may be contained within a suitable geometrically sub-critical (nuclear criticality) reactor. The process may then include filtering the gaseous product, comprising mainly unreacted fluorine gas, diluent gas and uranium hexafluoride, passing from the reactor to retain solid material within the reactor.

The separating of the uranium hexafluoride from the unreacted fluorine gas and diluent gas may be effected by any suitable, preferably non-aqueous, means. Typically, it may be effected by crystallizing out the uranium hexafluoride from the remaining gases. This may be effected by passing the gaseous product from the reactor through at least one cold trap which is at a temperature below the crystallizing point of uranium hexafluoride.

The invention will now be described by way of example with reference to the accompanying diagrammatic drawings.

Figure 1:
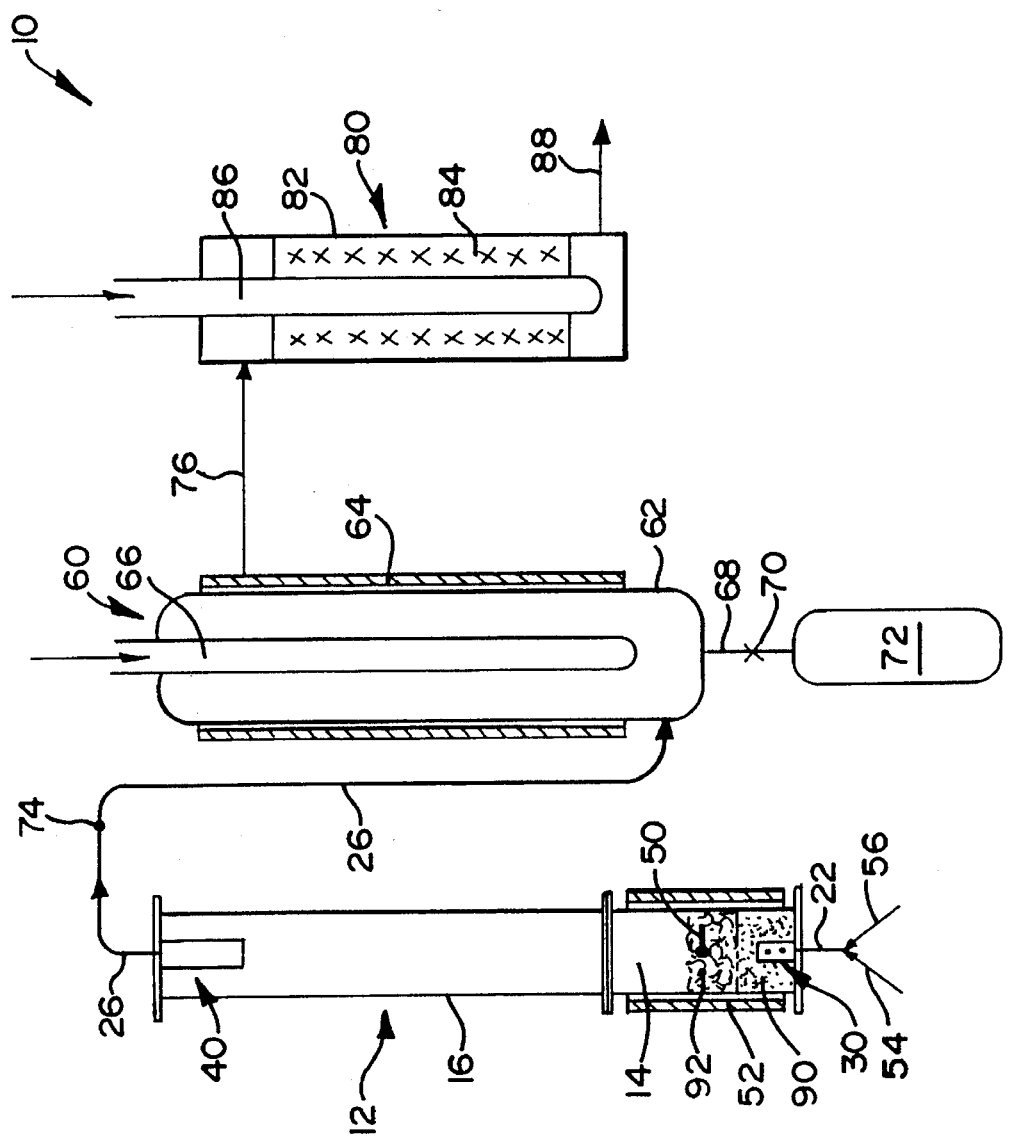
FIG. 1 shows a simplified flow diagram of a process according to the invention for producing uranium hexafluoride.
Figure 2:
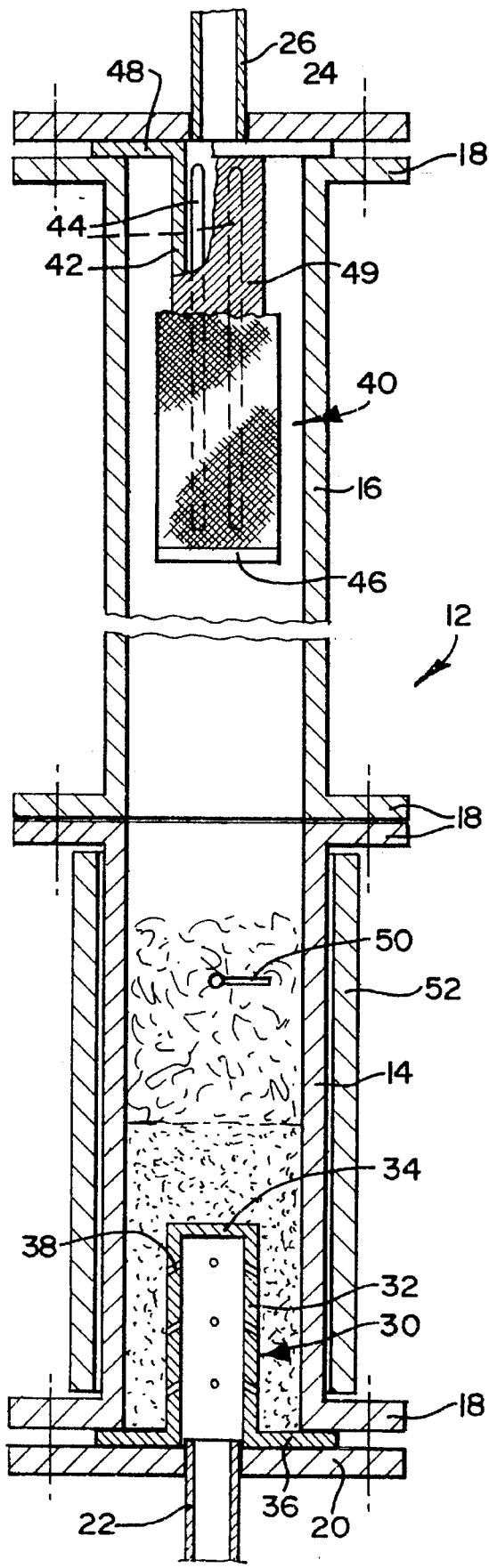
FIG. 2 shows an enlarged longitudinal sectional view of the reactor of FIG. 1.

In the drawings, reference numeral 10 generally indicates a process according to the invention, for producing uranium hexafluoride.

The process 10 includes a vertical pipe reactor, generally indicated by reference numeral 12. The reactor 12 comprises a lower flanged cylindrical portion 14, and upper flanged cylindrical portion 16. The portions 14, 16 can be secured together by bolting their flanges 18 together. The lower end of the lower portion 14 is closed off with a circular end plate 20 which is bolted to the lower flange 18 of the lower portion. The end plate 20 has a central aperture from which leads a pipe or conduit 22. Likewise, the upper end of the upper portion 16 is closed off in similar fashion with a circular end plate 24 having a central aperture from which leads a pipe or conduit 26.

A diffuser, generally indicated by reference numeral 30 is located at the lower end of the lower portion 14. The diffuser 30 comprises a sleeve-like portion 32 protruding upwardly into the lower end of the lower portion 14, with its upper end closed off with an end piece 34. A flange 36 extends peripherally outwardly around the lower end of the sleeve-like portion 32 and is sandwiched between the flange 18 of the lower end of the lower portion 14 and the end plate 20. A plurality of circumferentially and longitudinally spaced passageways 38 are provided in the sleeve-like portion 32, with the passageways 38 being angled downwardly outwardly to inhibit passage of dust and particulates into the inside of the portion 32.

At the upper end of the upper portion 16 is provided a filter, generally indicated by reference numeral 40. The filter 40 comprises a cylindrical portion 42 having a plurality of circumferentially spaced elongate slots 44 therein. The lower end of the sleeve-like portion 42 is closed off with an end piece 46, and a flange 48 is provided around its upper end. The flange 48 is sandwiched between the upper flange 18 of the upper portion 16 and the end piece 24. The portion 42 can be of aluminium. Sub-millimeter thickness PTFE (polytetrafluoro ethylene) thread windings 49 are provided in cotton-reel and multi-layer fashion around the portion 42. The windings are sufficiently dense to provide a desired 'mesh' size, ie to prevent passage of particles above a required size, typically 1 micro m.

A temperature sensor 50, ie a thermocouple, is provided in the reactor 12.

Typically, the length of the reactor 12 can be about 2000 mm, with the length of the lower portion 14 being about 600 mm. The diameter of the reactor may be about 75 mm. The height of the diffuser may be about 50 mm, and its diameter about 20 mm. The length of the filter 40 may be about 200 mm and its diameter about 40 mm.

An electrical heating element 52 is provided around the lower portion 14 of the reactor 12.

The reactor 12 is geometrically sub-critical with respect to nuclear criticality. The reactor is of any suitable material, such as monel or inconel.

A fluorine ($F_2$) flow line 54 leads into the conduit 22, as does a nitrogen ($N_2$) flow line 56.

The conduit 26 leads to the bottom of a cold trap or crystalliser, generally indicated by reference numeral 60. The crystallizer 60 comprises a cylindrical vessel 62 surrounded by an electrical heating element 64. A liquid nitrogen stand pipe 66 leads into the vessel 62, while a conduit 68, fitted with a valve 70, leads from the bottom of the vessel 62 to a uranium hexafluoride container 72.

A uranium hexafluoride monitor 74 is provided in the conduit 26.

A conduit or flow line 76 leads from the crystalliser 60 to a carbon trap, generally indicated by reference numeral 80. The carbon trap 80 comprises a cylindrical vessel 82 housing a bed of activated carbon 84. A liquid nitrogen stand pipe 86 extends into the bed 84, and an offgas withdrawal conduit or flow line 88 leads from the bottom of the vessel 82.

In use, highly enriched uranium metal shavings are produced on a lathe under controlled conditions to prevent contamination and under an inert atmosphere to contain inherent fire risks or hazards associated therewith. The shavings are approximately 0,5 mm thick, 1 mm wide and 3–4 mm long. The shavings thus provide a relatively large surface area per unit volume of shavings, for effective contact between the uranium metal and fluorine gas as described in more detail hereunder.

The uranium metal shavings are mixed, under an inert atmosphere, with substantially inert particles or granules, such as $CaF_2$, $AlF_3$ and $Al_2O_3$ granules, having an average particle size of about 8 mm. The mass ratio of metal shavings to inert granules is between 27:1 and 23:1. Preferably, the granules are in sintered form. Again, care is taken to prevent contamination during mixing. The granules are substantially inert at the reactive conditions maintained in the reactor 12.

The mixture of uranium metal shavings and inert granules is loaded, under an inert atmosphere, into the detachable lower portion 14 of the reactor 12. Prior to loading the mixture into the lower portion 14, the diffuser 30 is covered with a bottom layer 90 of the same inert granules as used in the mixture, with the mixture thus forming an upper layer 92 on top of the bottom layer. Instead, for the bottom layer 90, an alternative species of inert granules can be used. Furthermore, in the mixture of the upper layer, a blend of two or more different or alternative species of the inert granules can be used.

The reactor 12 is then heated, by means of the heating element 52, to above 120° C., typically to about 150° C., under an inert nitrogen atmosphere, to provide the activating (threshold) energy for the subsequent exothermic reaction.

Thereafter a mixture of fluorine gas, along the flow line 54, and an inert carrier gas, such as nitrogen, along the flow line 56, enters the bottom of the reactor 12 via the conduit 22. The mass ratio of fluorine gas to nitrogen is typically about 1:2. The fluorine gas and nitrogen maintain their constituent identities, ie the fluorine does not react to any significant degree with the nitrogen as it passes through the bed layers 90, 92. The gas mixture is fed into the reactor at a closely controlled rate, with the mass ratio of fluorine gas to uranium metal shavings typically being in the region of 0,9 kg F$_2$/kg U to 1,2 kg F$_2$/kg U, and the mass flow rate typically being in the region of 0,04 kg F$_2$/h/kg U and 0,06 kg F$_2$/h/kg U.

The reactor 12 operates on a dry basis, ie without any significant moisture being present. The inlet gas pressure to the reactor is slightly above atmospheric pressure, typically 10 kPa gauge pressure. However, it must be below the dew point pressure of both fluorine and nitrogen at the temperature in the crystallizer 60, to prevent liquefaction therein of either the fluorine or the nitrogen.

On introduction of the fluorine/nitrogen gas mixture into the reactor 12, at the elevated temperature of about 150° C. as hereinbefore described, exothermic reaction of the fluorine gas with the uranium metal shavings commences.

Once the exothermic reaction has commenced as indicated by a sharp increase in temperature, the reaction temperature is maintained at a suitable level commensurate with the material of construction used for the reactor and being sufficiently low to prevent sintering of the product formed in the reactor. Thus, the temperature is maintained at a value below 500° C. and can even be maintained below 400° C., but it must be sufficiently high to maintain a satisfactory reaction rate. Control of the reaction temperature is effected by controlling the input energy from the heating element 52, as well as the fluorine and nitrogen flow rates and ratios. Towards the end of the reaction period, ie when substantial uranium hexafluoride (UF$_6$) has exited the reactor 12, the nitrogen flow rate can be reduced considerably to obtain as complete reaction of the uranium to uranium hexafluoride as possible. The reaction period is typically 16–20 hours.

Uranium hexafluoride, which is in gaseous form, passes upwardly through the reactor 12, together with unreacted fluorine and nitrogen, and through the porous filter 40 which filters out any solid material which may be carried up the reactor 12 by the gases. This is effected by the gas and entrained particulates being forced onto the PTFE windings 49. The gas passes between the fibres, while particulate material remains on or in the windings. The filter 40 can be cleaned periodically by backflushing with nitrogen.

The gaseous stream passes along the flow line 26, with the UF$_6$ content thereof being monitored by means of the sensor 74, to the crystallizer or cold trap 60. In the crystallizer 60, UF$_6$ crystallizes out against the cold surfaces of the vessel 62, while the residual gases pass, via the flow line 76, to the activated carbon trap 80 where residual fluorine therein is absorbed/reacted for disposal, with offgas being withdrawn along the flow line 88. The trap 80 can also be cooled, eg by means of liquid nitrogen, to control the fluorine absorption reaction rate and reaction temperature.

If desired, fluorine with or without some nitrogen may be withdrawn from the crystallizer 60 for re-use in the reactor 12.

From time to time, the cold trap 60 can be decommissioned, and the crystallized UF$_6$ product vaporized or liquified by activating the heating element 64. Gaseous or liquid UF$_6$ is then withdrawn therefrom via the flow line 68 into the vessel 72 which is of geometrically safe nature (nuclear criticality).

The ratio of fluorine to nitrogen entering the reactor 12 should be controlled such that the partial pressure of fluorine does not exceed 35 kPa since the combination of high system pressure, and in particular high fluorine partial pressure, and low gas flow through the cold trap 60 could lead to fluorine and nitrogen liquifying in the cold trap 60. On heating up of a cold trap in which such liquifaction has occurred, evaporation of liquified fluorine and/or nitrogen, and resultant uncontrolled pressure build-up, may occur. This is avoided by maintaining the fluorine partial pressure below 35 kPa. Thus, instead of using liquid nitrogen as coolant in the cold trap 60, another coolant having a higher temperature, such as solid CO$_2$/alcohol mixture (−80° C.) can be used. Such coolant can also be used for the trap 80.

The viability of the process according to the invention for producing uranium hexafluoride has been demonstrated confidentially on laboratory and pilot plant scale, with the laboratory scale apparatus and pilot plant apparatus being substantially in accordance with the flow diagram. The laboratory scale apparatus and pilot plant apparatus operated batchwise, with loadings of up to 2 kg uranium. It was found that the process 10 was typically about 92% efficient in converting highly enriched uranium to uranium hexafluoride, with the remaining 8% constituting unreacted uranium and uranium compounds which remained in the reactor. It is believed that the process 10 can also readily be converted to a continuous process by automating loading of the reactor 12, eg by means of a screw conveyor, and effecting separation or extraction of the UF$_6$ by utilizing two or more crystallizers 60 operating in parallel with appropriate valving.

It is believed that the process 10, which is, as stated hereinbefore, a dry process not involving the use of moisture, provides an effective means for the direct conversion of uranium metal, and in particular highly enriched uranium, to uranium hexafluoride. It presents less contamination problems than known wet processes for producing uranium hexafluoride. Further, the volume and mass of waste products generated by the process 10 is relatively small, and are limited to fluorocarbons from the spent carbon of the activated carbon trap 80 and which contains virtually no uranium. Unreacted uranium residue and uranium compounds remaining in the reactor 12 can be mixed with fresh inert solid material and recycled to the reactor 12. Alternatively these materials can be leached, using nitric acid, to recover residual uranium therefrom.

Without wishing to be bound by theory, the Applicant believes that the operation of the reactor 12 can be characterized as comprising three phases. During a first phase, the reactor is pre-heated to the temperature of about 150° C. at which the exothermic reaction is initiated when fluorine is introduced. During the second phase, conversion of uranium metal to an intermediate uranium fluoride(s) eg UF$_4$ or UF$_5$, without substantial production of UF$_6$, is effected. Thereafter, during a third phase, conversion of the intermediate fluoride(s) to UF$_6$ takes place.

If desired, the reactor 12 can be vibrated periodically, particularly near the end of the reaction period, to cause the layers of particles, ie the bed of particles, to settle or collapse, thereby enhancing contact of the fluorine gas with the uranium shavings.

The Applicant thus believes that the process 10 will be particularly suitable for converting highly enriched uranium to highly enriched uranium hexafluoride, which can then be blended with uranium hexafluoride of suitable (lesser) enrichment, to obtain a product with an enrichment level suitable for further processing in commercial nuclear reactors. The product is thus typically reactor grade nuclear fuel comprising uranium enriched to 3–5% U-235.

The Applicant has further found that the loading of the reactor 12 can be accomplished easily. Thus, the inert granules loaded into the reactor as the layer 90 is effected routinely. Furthermore, the preparation of the mixture of highly enriched uranium metal shavings and inert granules can be effected relatively straight-forwardly, and without contamination, under an inert atmosphere. It is thus not necessary to compress and mould the mixture.

When using highly enriched uranium, especially in a mixture with another material (in this case an inert solid), parameters such as mass, density, volume, geometry, moderating properties of mixing material, mixing proportions, enrichment of uranium, nature of uranium, ie whether powdery, lumpy, etc must be considered carefully, to reduce the risk of nuclear criticality being reached. In the process 10 all these parameters have been taken into consideration.

I claim:

1. A process for producing uranium hexafluoride, which comprises providing a fixed bed of reactive particles comprising uranium metal;

bringing fluorine gas into contact with the bed of reactive particles, as well as with non-reactive particles which are substantially inert and which are in contact with the reactive particles, while keeping the reactive particles distinct from the non-reactive particles;

allowing the fluorine gas to react with the uranium metal at elevated temperature, thereby to produce gaseous uranium hexafluoride; and separating the uranium hexafluoride from any residual fluorine.

2. A process according to claim 1, wherein the reactive particles comprise highly enriched uranium so that the uranium hexafluoride is thus highly enriched; the reactive particles comprise at least one further metal, in addition to the uranium, with the further metal reacting with the fluorine gas to form non-volatile metal fluorides which do thus not contaminate the gaseous uranium hexafluoride produced; the bringing into contact of the fluorine gas with the particles is effected by passing the fluorine gas upwardly through the bed of particles; and the reaction temperature is controlled at between 300° C. and 500° C.

3. A process according to claim 2, wherein the bed comprises a bottom layer of the non-reactive particles, and an upper layer of the reactive particles on top of the bottom layer, with the bottom layer dispersing the fluorine gas over a wide area, thereby inhibiting formation of localized 'hot spots' due to uncontrolled localized reaction of fluorine gas with uranium metal and thus controlling the reaction temperature at least partly by means of the layers in the bed.

4. A process according to claim 2, wherein the bed comprises a bottom layer of non-reactive particles and an upper layer which is a mixture of reactive and non-reactive particles, with the non-reactive particles in the upper layer spreading the heat of reaction throughout the upper layer and dispersing the reactive particles, thereby assisting in controlling the reaction temperature and with the mass ratio of reactive particles and non-reactive particles in the upper layer being between 30:1 and 20:1.

5. A process according to claim 2, wherein the reactive particles are in the form of shavings, while the non-reactive particles are in the form of rounded particles, having a maximum dimension of about 5 to 15 mm, and comprising calcium fluoride ($CaF_2$), aluminium fluoride ($AlF_3$) and/or sintered aluminium oxide ($Al_2O_3$).

6. A process according to claim 2, wherein the controlling of the reaction temperature is effected at least partly by passing a diluent gas through the bed of particles, together with the fluorine gas, with the diluent gas diluting the fluorine gas and hence retarding the reaction rate, thereby controlling the reaction temperature, and which includes controlling the fluorine gas flow rate and/or the diluent gas flow rate and/or the mass ratio of florine gas to diluent gas, thereby to assist in controlling the reaction temperature, with the mass ratio of flourine gas and diluent gas being between 1:1 and 1:20.

7. A process according to claim 6, wherein the bed of particles is contained within a suitable geometrically subcritical (nuclear criticality) reactor, with the process including filtering the gaseous product, comprising mainly unreacted fluorine gas, diluent gas and uranium hexafluoride, passing from the reactor to retain solid material within the reactor, and with the separating of the uranium hexafluoride from the unreacted fluorine gas and diluent gas being effected by crystallizing out the uranium hexafluoride from the remaining gases by passing the gaseous product from the reactor through at least one cold trap which is at a temperature below the crystallizing point of the uranium hexafluoride.

8. A process according to claim 1, wherein the mass ratio of fluorine gas to uranium is between 0,5 kg fluorine gas per kg uranium and 1,5 kg fluorine gas per kg uranium; the mass flow rate of fluorine gas is between 0,04 kg fluorine gas per hour per kg uranium and 0,15 kg fluorine gas per hour per kg uranium; the reaction of the fluorine gas with the uranium is effected under substantially dry conditions; and the reaction of the fluorine gas with the uranium is effected at a pressure greater than atmospheric pressure.

9. A process for producing uranium hexafluoride, which comprises passing fluorine gas upwardly through a bed of particles, the bed comprising an upper layer of reactive particles comprising uranium metal, as well as a bottom layer of non-reactive particles which are substantially inert and which are thus in contact with the reactive particles, while keeping the reactive particles distinct from the non-reactive particles, thereby to bring the fluorine gas into contact with the particles;

allowing the fluorine gas to react with the uranium metal at an elevated temperature between 300° C. and 500° C., thereby to produce gaseous uranium hexafluoride, with the bottom layer of particles serving to disperse the fluorine gas over a wide area, thereby inhibiting formation of localized 'hot spots' due to uncontrolled localized reaction of fluorine gas with uranium metal, with the reaction temperature thus being controlled at least partly by means of the layers of particles making up the bed; and separating the uranium hexafluoride from any residual fluorine.

10. A process for producing uranium hexafluoride particles, which comprises passing fluorine gas upwardly through a bed of particles, the bed comprising an upper layer which is a mixture of reactive particles comprising uranium metal, as well as non-reactive particles which are substantially inert and which are thus in contact with the reactive particles, the bed further comprising a bottom layer of non-reactive particles which are substantially inert, while keeping the reactive particles distinct from the non-reactive particles, thereby to bring the fluorine gas into contact with the particles;

allowing the fluorine gas to react with the uranium metal at an elevated temperature between 300° C. and 500°

C., thereby to produce gaseous uranium hexafluoride, with the non-reactive particles in the upper layer spreading the heat of reaction throughout the upper layer and dispersing the reactive particles, thereby to assist in controlling the reaction temperature; and separating the uranium hexafluoride from any residual fluorine.

11. A process according to claim 10, wherein the mass ratio of reactive particles to non-reactive particles in the upper layer is between 30:1 and 20:1.

12. A process for producing uranium hexafluoride, which comprises passing fluorine gas as well as a diluent gas upwardly through a bed of particles, the bed comprising reactive particles comprising uranium metal, as well as non-reactive particles which are substantially inert and which are in contact with the reactive particles, while keeping the reactive particles distinct from the non-reactive particles, with the bed of particles being contained with a suitable geometrically subcritical (nuclear criticality) reactor, thereby to bring the fluorine gas into contact with the particles;

allowing the fluorine gas to react with the uranium metal at an elevated temperature between 300° C. and 500° C., thereby to produce a gaseous product comprising mainly uranium hexafluoride, unreacted fluorine gas, and diluent gas, with the diluent gas diluting the fluorine gas and hence retarding the reaction rate, thereby controlling the reaction temperature;

allowing the gaseous product to pass from the reactor;

filtering the gaseous product passing from the reactor to retain solid material within the reactor; and separating the uranium hexafluoride from unreacted fluorine gas and the diluent gas by crystallizing out the uranium hexafluoride from the remaining gases.

13. A process according to claim 12, wherein the crystallization is effected by passing the gaseous product from the reactor through at least one cold trap which is at a temperature below the crystallizing point of uranium hexafluoride.

14. A process for producing uranium hexafluoride, which comprises bringing fluorine gas into contact with reactive particles comprising uranium, as well as with non-reactive particles which are substantially inert and which are in contact with the reactive particles, while keeping the reactive particles distinct from the non-reactive particles;

allowing the fluorine gas to react with the uranium metal at elevated temperature and at a pressure greater than atmospheric pressure, thereby to produce gaseous uranium hexafluoride; and separating the uranium hexafluoride from any residual fluorine.

* * * * *